United States Patent Office 3,399,167
Patented Aug. 27, 1968

3,399,167
POLYURETHANES STABILIZED WITH DIALKYL SEMICARBAZIDES OR DIALKYL CARBAZINIC ACID ESTERS
Friedrich Karl Rosendahl, Heinrich Rinke, and Harald Oertel, Leverkusen, Germany, assignors to Farbenfabriken Bayer Aktiengesellschaft, Leverkusen, Germany, a German corporation
No Drawing. Filed May 14, 1964, Ser. No. 367,589
Claims priority, application Germany, May 17, 1963, F 39,769
7 Claims. (Cl. 260—45.8)

ABSTRACT OF THE DISCLOSURE

Polyurethane polymers are stabilized against discoloration and oxidation by having incorporated therein from about 0.5 to about 15 percent by weight of a 1,1-dialkyl semicarbazide or a 1,1-dialkyl carbazinic acid ester.

---

This invention relates to polyurethane plastics and to a method of preparing the same. More particularly, it relates to a method of stabilizing polyurethane plastics against discoloration and oxidation.

Synthetic resins containing urethane groups, such as can be obtained by the isocyanate polyaddition process to oxidation or other degradative influences. Thus, for example, polyester urethanes are relatively stable to oxygen and ozone whereas polyether urethanes and especially polythioether urethanes more easily undergo oxidative degradation, particularly under the simultaneous effect of light.

It is already known that polyurethane resins which are discolored relatively little by light are obtained when aliphatic diisocyanates, e.g., hexamethylene diisocyanate, are used for building up the macromolecules. However, it has been found that the more reactive aromatic polyisocyanates, which are used almost exclusively, especially the isomeric toluylene diisocyanates, phenylene-1,4-diisocyanate diphenylmethane-4,4'-diisocyanate and naphthalene-1,5-diisocyanate lead to relatively rapid and strong discoloration, producing a yellow to brown color, when exposed to sunlight or artificial light, especially light having a high proportion of UV rays, and this is frequently associated with a deterioration in the mechanical properties. The degree of discoloration increases in the given series of aromatic polyisocyanates.

In a given polyisocyanate, different chain-lengthening agents with reactive hydrogen atoms also lead to differences in the light fastness of the synthetic resins, e.g., when 4,4'-diphenylmethane diisocyanate is used, which leads to polyurethane resins containing the grouping —Ar—NH—CO—NH—, it is found that the tendency to discoloration in UV light varies with different chain-lengthening agents, decreasing in the following sequence:

| Characteristic Grouping | Chain Lengthening Agent | Literature |
| --- | --- | --- |
| (1) —Ar—NHCONH—Ar— | Water, aromatic amines | D.B.P. 888,766. |
| (2) —Ar—NHCONH—Ar— | Aliphatic amines | D.B.P. 826,641. |
| (3) —Ar—NHCONH—NHCONH— | Hydrazine | D.B.P. 951,376; U.S.P. 2,957, 252. |
| (4) —Ar—NHCONH—NHCONH—NHCONH— | Carbohydrazide | |
| (5) —Ar—NHCONH—NHCO— | Carboxylic acid hydrazides | D.B.P. 1, 123, 467. |
| (6) —Ar—NHCONH—NHCO—X— | Carbazinic ester (X=0); Semicarbazide (X=NH) | |
| (7) —Ar—NHCONH—N(CH$_2$CH$_2$)$_2$N—NHCONH— | N,N'-diaminopiperazine | U.S.P. 3, 040, 003. | from polyisocyanates and generally, from high molecular weight polyhydroxyl compounds and, in some cases, chain-lengthening agents with active hydrogen atoms, e.g., glycols, water, polyamines, hydrazine, di-hydrazines, polycarboxylic acid hydrazides, polysemicarbazides and polycarbazinic acid esters by various processes can be widely used as fibers, foils, coatings, lacquers, foam plastics and elastomers owing to their favorable properties (high tear strength, abrasion resistance, resistance to hydrolysis and, in some cases, high elasticity).

However, for a number of purposes it is a disadvantage that these polyurethane synthetic resins are insufficiently stable against discoloration due to light (sunlight or UV radiation), especially in the presence of oxygen (air). This is true particularly in the case of synthetic resins having a relatively large surface area, such as fibers, foils, coatings and foam plastics. Depending on the components from which they are built up, the polyurethane synethic resins vary in their sensitivity Thus, for example, the first visible discoloration when 4,4'-diaminodiphenylmethane is used as chain lengthening agent occurs only after one hour, with hydrazine after four hours and with N,N'-diamino piperazine after eight hours.

Polyurethane resins obtainable by other processes, e.g., by reacting chlorocarbonic acid esters of polyhydroxyl compounds with aromatic diamines, show practically the same behavior when exposed to light as materials obtainable by the isocyanate polyaddition process proper.

A large number of auxiliary agents are already known which are intended to reduce the deterioration of the mechanical properties of polyurethane resins under the action of air or oxygen, often with the simultaneous action of sunlight or artificial light, for example, various antioxidants or substances which absorb ultraviolet, or combinations of such substances, e.g., phenothiazine, phenyl-β-naphthylamine, dinaphthyl-p-phenylenediamine, 2-mercapto-imidazoline and a number of substituted phenols, in particular derivatives of o,o'-dihydroxy-benzophenone or diphenylmethane. Carbon black also has certain effects as age-resistors. Although a certain protection can be obtained with these additives, their own colors or the discolorations of the antioxidants or ultraviolet absorbents which occur have a disturbing effect. In the case of polyurethane resins based on aromaitc polyisocyanates, the protective action is often not sufficient. For colorless or pale pigmented polyurethane resins, especially highly elastic fibers, foils, textile coatings and foam plastic, it is necessary to use stabilizers which have no self color or only a very pale self color and which are not discolored by the action of light and/or oxygen.

Synthetic resins which contain urethane groups and —NHCONH— groups may be stabilized against discoloration under the action of light by compounds having the grouping —OCONHNH$_2$— or —NHCONHNH$_2$ in accordance with U.S. application Ser. No. 264,776, but the use of these substances is limited to polyurethanes which are free from NCO. Furthermore, under thermal stress (temperatures about 100°), these substances lead to a certain degradation of the macromolecules in polyurethane. When primary or secondary aliphatic amines are used for stabilizing polyurethane elastomers containing ureylene groups with the grouping —Ar—NHCONH—NHCONH—Ar— the amines give rise to slight discolorations in the solutions of the high molecular weight compounds, and the macromolecule is degraded, especially when exposed to heat. Tertiary amines (e.g., poly-(N,N-diethyl-$\beta$-aminoethyl-methacrylate) have a very much lower stabilizing effect compared to the nitrogen containing compounds claimed in the invention.

It is therefore an object of this invention to provide polyurethane plastics stabilized against discoloration and oxidation. It is another object of this invention to provide a method of stabilizing polyurethane plastics against discoloration and oxidation. It is another object of this invention to provide polyurethane foams, foils, coatings, threads and the like which are stable to light and oxidation.

The foregoing objects and others which will become apparent from the following description are accomplished in accordance with the invention generally speaking by providing polyurethanes containing from about 0.5 to about 15% by weight 1,1-dialkyl semicarbazides or 1,1-dialkyl carbazinic esters. Thus, the invention contemplates the stabilization of polyurethane plastics particularly those having recurring —Ar—NHCONH— and/or —Ar—NHCOO— groups where Ar is aromatic by incorporating therein 1,1-dialkyl semicarbazides or 1,1 - dialkyl carbazinic acid esters.

Derivatives obtained by acylation (analogous to the alkylated compounds used according to the invention) of carbazinic esters or semicarbazides have no stabilizing effect under radiation with UV light, in contrast to the compounds with free —CONHNH$_2$— groups.

It has been found advantageous that these compounds are colorless and that after exposure to light and/or oxidation, they remain colorless in the polyurethane resins which they stabilize.

Furthermore, in contrast to many substances hitherto used, the new stabilizers lead to no degradation inside the macromolecules of the polyurethane resins, even when heated to elevated temperatures (e.g., 100 to 140° C.). Furthermore, crosslinking reactions within the polyurethane resins, e.g., with ethylene imide compounds, epoxides, polyisocyanates or compounds that give off formaldehyde are not inhibited by the presence of the stabilizers according to the invention.

Polyurea resins obtained from diisocyanates and diamino piperazines are known which are relatively stable to light. However, it was not to be expected that 1,1-dialkyl substituted semicarbazides which are stable to light, would be able to render other polyurethane resins with recurring —Ar—NHCONH— and/or —Ar—NHCO—O— groups stable to light. In contrast to this, polyurea resins made from hexane-1,6-diisocyanate and piperazine are stable to light, but when added to polyurethane resins with —Ar—NHCONH— and/or —Ar—NHCO—O— groups, they cannot stabilize them against discoloration. Also, for example, the compound obtained from 1 mol hexane-1,6-diisocyanate and 2 mols dimethylamine has no stabilizing effect whatsoever.

Compounds which can be derived from dialkyl-thio-semicarbazide or dialkyl-thiocarbazinic esters cannot be used to prevent discoloration of the synthetic resins and in most cases, they even increase the intensity of the discoloration of the polyurethane resins.

The stabilizers used according to the invention, may easily be added either during or after the preparation of the polyurethane resins with recurring —Ar—NHCONH— and/or —Ar—NHCONH—O— groups, which resins may incidentally be of any composition depending upon the purpose for which they may be required, and the stabilizers may be added in the required concentration without otherwise altering the technique of the process. This addition of stabilizers to polyurethane resins is advantageous since it has been found that the stabilizers are themselves used up, for example, under the action of light and/or oxygen, the stabilizer molecule being thereby degraded. Thus, in contrast to stabilizers which constitute linking groups of the high molecular chains, these added stabilizers leave the chains of macromolecules unaffected when they are used up under the action of light.

A considerable number of the 1,1-dialkyl substituted semicarbazides and carbazinic acid esters used according to the invention contain the groups:

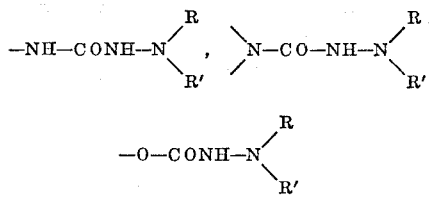

in the molecule, where R and R' are the same or different alkyl radicals which may be in closed rings or may carry further substituents. The rings may contain hetero atoms and they may themselves, like R and R', be the starting point for further groups of the type indicated above.

The stabilizers claimed in the invention may be obtained in known manner from asymmetrically di-substituted hydrazines, e.g., from N,N-dimethylhydrazine, N,N-dipropylhydrazine, N,N-distearylhydrazine, N-methyl-N-isopropylhydrazine, N,N - di - ($\beta$-hydroxyethyl)-hydrazine, N-methyl-N-ethylhydrazine, N,N-diisopropylhydrazine, N-methyl - N - benzylhydrazine, N,N'-diamino-N,N' - dimethylhexane-1,6-diamine, N-aminopyrrolidine, N-amino-piperidine, N-amino - 4 - methyl-piperidine, N-amino-2,4-dimethylpiperidine, N - amino-4-hydroxypiperidine, N-aminomorpholine, N-amino - N' - methyl-piperazine, N-amino-N'-($\beta$-hydroxyethyl)-piperazine, N-amino-2,5-diethyl-N'-methyl-piperazine, N-amino-piperazine-N'-carboxylic acid-ethylene imide, N-amino-4-diethylamino-piperidine, N,N'-diamino-piperazine, and its alkyl substitution products or from 4-amino-1,2,4-triazole.

Stabilizers of the "dialkyl semicarbazide type" may easily be prepared for example, by reacting the asymmetrically di-substituted hydrazines with mono- or polyisocyanates (or mono- or polycarbamic acid chlorides). Examples include the reaction products with aliphatic isocyanates, e.g., butylisocyanate, 6-chlorohexylisocyanate, cyclohexylisocyanate, stearylisocyanate, 1,4-tetramethylenediisocyanate, 1,6 - hexamethylenediisocyanate, cyclohexane-1,3-(or -1,4-), diisocyanate, 1,12-dodecamethylenediisocyanate, dicyclohexyl - 4,4' - diisocyanate, dicyclohexylmethane-4,4'-diisocyanate; also, the reaction products with aromatic or aliphatic-aromatic isocyanates, e.g., phenylisocyanate, p-chlorophenyl-isocyanate, 2-(or 3-, or 4-)ethyl-phenyl-isocyanate, benzylisocyanate, phenylene-1,3-(or 1,4-)-diisocyanate, toluylene-2,4-(or -2,5-, or -2,6-)-diisocyanate, tetraline-1,5-diisocyanate, diphenyl-3,3'-(or -4,4'-) - diisocyanate, 3,3'-dichloro-diphenyl-4,4'-diisocyanate, diphenylmethane-4,4'-diisocyanate, 3,3'-dimethyl - diphenylmethane-4,4'-diisocyanate, naphthylene-1,5- (or -2,6-)-diisocyanate, 1,3-diisopropylbenzene-2,4-diisocyanate, 3,3',5,5'-tetraethyldiphenylmethane-4,4'-diisocyanate, 1,2,3,4,5,6-hexahydro - diphenylmethane-4,4'-diisocyanate, dimers of toluylene-2,4-diisocyanate, 4,4',4'',4'''-tetraphenylmethane tetraisocyanate, 1,3,5-benzenetriisocyanate.

Of the stabilizers of the dialkyl semicarbazide type, the group of dialkyl semicarbazides derived from aliphatic isocyanates (or carbamic acid chlorides) is found even more effective than the stabilizers prepared from aromatic mono- or polyisocyanates and are therefore, preferentially used. The stabilizing effect of the aromatic dialkyl semicarbazides decreases with the increasing tendency of the basic polyisocyanate from which the polyurethanes is formed to discolor. Thus, for example, the protective action of dialkyl semicarbazides derived from diphenylmethane-4,4'-diisocyanate is less than that of the stabilizers derived from phenylene-1,4-diisocyanate. The dialkyl semicarbazide compounds which are derived from araliphatic polyisocyanates, or from isocyanates, which are alkyl substituted in the ortho-position to the NCO group are generally comparable in their protective action to the aliphatic dialkyl semicarbazide derivatives.

The stabilizers of the "dialkyl carbazinic ester type" are obtainable, for example, by reacting the said dialkyl hydrazines with chlorocarbonic acid esters of mono- or polyols such as, for example, methanol, ethanol, butanol, cyclohexanol, stearyl alcohol, ethylene glycol, butanediol, hexanediol, neopentyl glycol and the like. Examples are dimethylcarbazinic acid-ethyl ester, dimethylcarbazinic acid cyclohexyl ester, diethylcarbazinic acid stearyl ester, piperidine-N-amino-carboxylic acid butyl ester, pyrrolidine-N-amino-carboxylic acid stearyl ester, ethylene glycol-di-(N,N-dimethylcarbazinic acid ester), butanediol-1,4-di-(N,N-dibutylcarbazinic acid ester), phenylene-1,4-di-(β-hydroxyethylether-di-(N,N-dimethylcarbazinic acid ester), hydroquinone-di - (N,N - dimethylcarbazinic acid ester).

By reacting, for example, dialkylcarbazinic acid phenyl esters with compounds having secondary amino groups, e.g., piperidine, piperazine, diethylamine, polyethyleneimine, or by reacting carbamic acid chlorides (from secondary amines) and asymmetric dialkylhydrazines, 1,1-dialkyl semicarbazide derivatives are obtainable which are also alkyl substituted in the 4-position.

A number of the stabilizers indicated above are more or less readily soluble in water, and some of the relatively low molecular weight compounds are sufficiently volatile at elevated temperatures, especially in vacuo, that the stabilizing effect decreases under the prolonged action of heat on the polyurethane resins. Therefore, for polyurethane resins which are subjected to weathering or washing processes, especially fibers, foils or textile coatings or lacquers, it is preferable to use stabilizers which are only sparingly soluble or practically insoluble in water.

This is particularly the case with higher functional, high molecular weight stabilizers (molecular weight above 250, preferably above 500). Examples of such are reaction products of asymmetric dialkyl hydrazines with polyisocyanates, such as biuret-triisocyanate obtained from 1,6-hexamethylene diisocyanate or the reaction product of trimethylol propane with excess toluylene-2,4-diisocyanate. Also suitable are products which are obtained, for example, from the reaction of triisocyanates with only 2 mols of asymmetric dialkylhydrazines with molecular increase over the remaining NCO group with a poly-functional, relatively low molecular weight compound with reactive hydrogen atoms, such as ethylene diamine, hydrazine, diethylene triamine or polyethyleneimine. Similar increase in molecular size in order to reduce solubility is also possible by corresponding reaction will di- or tetra-functional isocyanates. Stabilizers which still contain free NCO groups may have their molecular size increased by di- or polymerization.

High molecular weight polyisocyanates such as are obtainable, for example by polymerization of isocyanates which contain vinyl groups, also represent suitable stabilizers after their reaction with dialkylhydrazines. Reaction products of polymeric hydrazines (obtainable by decarboxylation of 3-amino-2-oxazolidone) with isocyanates are also useful high molecular weight stabilizers.

A stabilization of polyurethane resins which is not destroyed by solubility in water and acid and is therefore particularly desirable for polyurethane fibers may be obtained by binding the stabilizing molecule directly chemically to the polyurethane to be stabilized by means of suitable reactive groups. Such a "fixation" of the stabilizer to the polyurethane molecule may be achieved, for example, through —COCl, —OCOCl, —NHCOCl, —C=C=O,

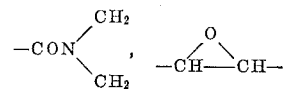

or groups which split off isocyanate, which are reacted under suitable conditions.

Stabilizers with free NCO groups are produced, for example, by reacting polyisocyanates with a deficiency of dialkylhydrazines, e.g., by reacting a triisocyanate with 2 mols of a dialkylhydrazine. In some cases, the NCO group may subsequently be converted by means of ethylene imine into the

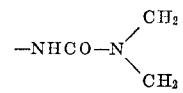

group which is stable at normal temperature, and by reacting with phenol or similar compounds, corresponding compounds which split off isocyanate and which react with polyurethanes at elevated temperatures (70 to 150°) may be obtained. Compounds such as N,N-dimethylhydrazine-carboxylic acid phenyl ester, N-amino-morpholine-N'-carboxylic acid phenyl ester, N,N-distearylhydrazine-carboxylic acid phenyl ester may also be reacted with polyurethane resins, in which case a reaction between the hypothetical dialkylaminoisocyanate and the reactive groups within the polyurethane takes place at elevated reaction temperatures (80 to 150°), phenol being split off. Polyurethane resins which contain the grouping —Ar—NHCONH—, which may preferably represent a portion of a grouping such as —Ar—NHCONHNH—, —Ar—NHCONHNHCO— react particularly easily with ethylene imide or isocyanate (splitting) groups. If compounds containing isocyanate groups are used as stabilizers, the polyurethane resins should preferably contain end groups such as, for example, —OH, —NH₂, —CONHNH₂ and —NHCONH₂. When COCl, OCOCl and NHCOCl groups are used as cohesive groups in the stabilizer, hydrogen chloride acceptors such as tertiary amines or aqueous alkalies are preferably present in the reaction.

Some 1,1-dialkylhydrazide derivatives show a tendency to complex formation when heavy metal salts are added, thus resulting in the precipitation of the corresponding heavy metal complex. Thus, CU-II salts have a strong complex forming effect. A similar, although considerably more powerful complex-forming tendency is shown by high molecular weight compounds which contain semicarbazides or carbazinic esters produced by the reaction of isocyanates with carboxylic acid hydrazides. Fixation between the synthetic resin and the stabilizer may be effected by complex formation between such polyurethane resins (see, for example, German Patent Specification 1,123,467) and the stabilizers according to the invention with heavy metal salts (e.g., Cu, Sn).

The stabilizers should be present in quantities of about 0.1 to 15% by weight, preferably 1 to 10% by weight, in the polyurethane resins. To obtain a technically practicable relation between stabilizer and polyurethane resin, it has been found that the stabilizer molecule should contain the active grouping —NHCONHN(CH₂—)₂, >NCONH—N(CH₂—)₂ or
—OCONHN(CH₂—)₂ in a concentration of at least 5% by weight preferably more than 25% by weight. Thus, the concentration of the effective light protective grouping for example, in the reaction product of hexane-1,6-diisocyanate and 2 mols of dimethylhydrazine is 68.5%, in the reaction product of biuret triisocyanate from hexane-1,6-diisocyanate with 3 mols dimethylhydrazine (idealized formula)

(CH₃)₂N—NHCONH—(CH₂)₆N[CONH(CH₂)₆—
NHCONH—N(CH₃)₂]₂ is 45.5% and in the reaction product of stearyl isocyanate with 1 mol dimethylhydrazine it is 28%.

If the concentration of active groupings in the stabilizer drops too low, for example, below about 5%, the stabilizing effect becomes practically negligible since in most cases, the quantity of stabilizer to be added to the polyurethane that needs stabilizing must not rise above a certain suitable limit (e.g., maximum 15%).

The stabilizer can be mixed in with the polyurethane in any desired manner and is preferably adapted to the process by which the polyurethane is prepared. The relatively good solubility of dialkyl semicarbazide or carbazine ester derivatives in many solvents such as dimethylformamide, dioxane, alcohols, chlorinated hydrocarbons as well as, in some cases, in the starting materials for the preparation of polyurethane, is found to be advantageous. Therefore, it is preferable to stabilize polyurethane masses, such as those used for the preparation of highly elastic fibers or foils, in solution by the addition of dialkylhydrazine derivatives. By suitable variation of the organic radicals in the stabilizer, its solubility and other properties may, in many cases, be adapted to the particular purpose. Thus, for example, compounds with long chain hydrocarbon radicals such as 4-stearyl-1,1-dimethylsemicarbazide are readily soluble in mixtures prepared for the production of lacquers or in high molecular weight polyhydroxyl compounds such as are used, for example, for the preparation of polyurethane foam plastic. In polyurethane elastomer foils or threads, for example, the above mentioned addition also reduces the adhesion, so that, for example, foils or threads may be worked up without covering them with talcum.

In the production of lacquers, textile coatings and foam plastics, it has been found particularly advantageous for the polyaddition reactions leading to polyurethane formation to be carried out in the presence of the stabilizers in such a manner that the stabilizing effect is not reduced. In some cases the isocyanate reactions may be calalytically accelerated owing to the weakly basic character of the N,N-dialkyl semicarbazides or carbazinic esters.

The polyurethane resins that are to be stabilized may be obtained by generally known processes, although the production by the isocyanate polyaddition process is preferred to a synthesis by a polycondensation process using, for example, chlorocarbonic acid esters of polyhydroxyl compounds and diamines although resins of the same constitution produced by the second method have practically the same properties as the materials obtained by the isocyanate polyaddition process.

In most processes, a preadduct with terminal isocyanate groups (NCO-preadduct) is first prepared by reacting polyhydroxyl compounds, which may be high molecular, with excess quantities of polyisocyanates, and the preadducts are then treated with chain lengthening agents or cross-linking agents.

The N,N-dialkylhydrazine derivatives claimed in the invention are particularly effective for stabilizing polyurethane resins based on aromatic diisocyanates which contain, in addition to the urethane bonds, also the grouping —NHCONH—. This grouping is preferably a portion of the grouping such as —NHCONHNH—,

—NHCONHNHCO—

—NHCONHNHCOHN—, —NHCONHNHCOO— or NHCONHNHCONHNHCONH— (a portion of the hydrogen atoms on the nitrogen atoms may be replaced by an organic radical). Such groupings are obtained by reacting isocyanate groups, for example, with water, primary or secondary amines, hydroxyamines, hydrazines, polyhydrazines, polysemicarbazides, polycarbazinic esters or carbohydrazide as chain lengthening agents or cross-linking agents.

The last mentioned polyurethane resins are also particularly suitable for reaction with stabilizers which contain reactive cohesive groups because their

—NHCONH— groups can react more easily than urethane groups with ethylene imides, splittable isocyanates or epoxides. After a reaction which may be begun by heating these synthetic resins contain the stabilizers which are fast to washing since they are chemically bound.

When aliphatic diamines, hydrazine or hydrazides and similar compounds are used as chain lengthening agents, their reaction with the NCO preadducts, which are mainly linear, is preferably carried out in highly polar solvents such as dimethylformamide, dimethylacetamide or dimethyl sulphoxide. In the solutions obtained, the stabilizers may easily be dissolved or added to them already in the dissolved form. Alternatively, the stabilizers may be added to the NCO preadduct solution before the addition of the chain lengthening agent, the polyaddition being only carried out subsequently. Solutions of polyurethane such as are obtained when polyurethanes produced without solvents are dissolved in dimethylformamide or other solvents are particularly suitable for the deformation of threads and fibers after dry or wet spinning processes or for casting foils or for coating (textile) bases.

The stabilizers may also be added to the liquid NCO preadducts (or their melts). From these NCO preadducts, foam plastics may be produced by known methods, for example, with water and/or polyols and/or inert blowing agents. By introducing polyhydroxyl compounds, e.g., butanediol-1,4- or aromatic diamines (e.g., 3,3'-dichloro-4,4'-diamino-diphenylmethane) as chain lengthening agents, elastomers may be obtained and by spinning NCO preadducts into solutions of aliphatic diamines, elastomer fibers may be obtained.

If elastomers, foam plastics or lacquers are produced in a single stage process, suitable quantities of stabilizers may be mixed with one of the components, preferably the high molecular polyhydroxyl compounds or the chain lengthening agents (e.g., water).

It is also possible to incorporate stabilizers in solid polyurethane masses, e.g., thermoplastic polyurethanes, with the use of kneading apparatus or rollers or by homogenization in extruder screws.

Application of stabilizers, e.g., by immersion or in spraying with solvents or emulsions is particularly suitable for foam plastics and, in some cases, also for fibers.

Any suitable organic polyisocyanate and preferably an aromatic polyisocyanate may be used in the preparation of polyurethanes such as, for example, ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-toluylene diisocyanate, 2,6-toluylene diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulfone-4,4'-diisocyanate, dichloro-hexamethylene diisocyanate, tetramethylene diisocyanate, pentamethylene diisocyanate, hexamethylene diisocyanate, furfurylidene diisocyanate, 1-chlorobenzene-2,4-diisocyanate and the like. The most preferred isocyanate is 4,4'-diphenylmethane diisocyanate. It is to be understood that higher polyisocyanates may also be used such as, for example, p,p',p''-triphenylmethane triisocyanate and the like.

Any suitable organic compound containing at least two active hydrogen containing groups may be used. It is preferred that the organic compound containing active hydrogen containing groups be substantially linear and have a molecular weight of from about 500 to about 5,000. Any suitable compound of this type may be used such as, for example, hydroxyl polyesters, polyalkylene ether glycols, polyhydric polythioethers, polyacetals and the like. Of course, the hydroxyl polyester may contain urethane groups, urea groups, amide groups, chalkogen linkages such as oxygen or sulfur and the like. Thus, the term "hydroxyl polyester" includes not only pure polyesters, but also polyester amides, polyester urethanes, polyether esters, polycarbonates and the like.

Any suitable hydroxyl polyester may be used such as, for example, the reaction product of a dicarboxylic acid and a dihydric alcohol. Any suitable dicarboxylic acid may be used in the preparation of a polyester such as, for example, adipic acid, succinic acid, suberic acid, sebacic acid, oxalic acid, methyladipic acid, glutaric acid, pimelic acid, azelaic acid, phthalic acid, terephthalic acid, isophthalic acid, thiodiglycollic acid, thiodipropionic acid, maleic acid, fumaric acid, citraconic acid, itaconic acid and the like. Any suitable dihydric alcohol may be used in the reaction with the polycarboxylic acid to form a polyester such as, for example, ethylene glycol, propylene glycol, butylene glycol, hexanediol, xylylene glycol and the like. The hydroxyl polyester should have a molecular weight of from about 500 to about 5,000, an hydroxyl number of from about 30 to about 300 and an acid number of less than about 5.

Any suitable polyester amide may be used such as, for example, the reaction product of an amine or an amino alcohol with a polycarboxylic acid. Any suitable amine such as, for example, ethylene diamine, propylene diamine and the like may be used. Any suitable amino alcohol such as, for example, beta-hydroxy ethyl amine and the like may be used. Any of the dicarboxylic acids set forth above with relation to the preparation of hydroxyl polyester may be used in the preparation of polyester amides. The polyester amides may also be prepared by reaction of diol-diamides such as, for example, the reaction product of adipic acid and diethanolamide, terephthalic acid-bis-propanol amide with a dicarboxylic acid. The polyester amides should have a molecular weight, hydroxyl number and acid number comparable to polyesters.

The polyesters and the polyester amides may be reacted with isocyanates to prepare hydroxyl or amine terminated compounds containing urethane and urea linkages which are suitable for use in the preparation of the spinning solution of this invention. Any suitable isocyanate which will be set forth hereinafter may be used.

Any suitable polyether ester may be used as the organic compound containing active hydrogen containing groups such as, for example, the reaction product of an ether glycol and a dicarboxylic acid such as those previously mentioned with relation to the preparation of polyesters. Any suitable ether glycol may be used such as, for example, diethylene glycol, triethylene glycol, 1,4-phenylene bis-hydroxy ethyl ether, 2,2'-diphenylpropane-4,4'-bis-hydroxy ethyl ether and the like.

Any suitable polyalkylene ether glycol may be used such as, for example, the condensation product of an alkylene oxide with a small amount of a compound containing active hydrogen containing groups such as, for example, water, ethylene glycol, propylene glycol, butylene glycol, amylene glycol and the like. Any suitable alkylene oxide condensate may also be used such as, for example, the condensates of ethylene oxide, propylene oxide, butylene oxide, amylene oxide and mixtures thereof. The polyalkylene ethers prepared from tetrahydrofuran may be used. The polyhydric polyalkylene ethers may be prepared by any known process such as, for example, the process described by Wurtz in 1859 and in the "Encyclopedia of Chemical Technology," volume 7, pages 257–262, published by Interscience Publishers in 1951 or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propylsulfide, 4,4'-dihydroxyl butylsulfide, 1,4-($\beta$-hydroxy ethyl)phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used.

For building up polyurethane resins, high molecular weight polyhydroxyl compounds having mainly terminal hydroxyl groups and a molecular weight of about 500 to 5,000 are preferred.

Polyurethanes derived from diphenylmethane-4,4'-diiso-cyanate are particularly in need of stabilizing to prevent early discoloration after exposure to light.

The following examples may be given for chain lengthening agents which may be used either individually or admixture: 1,4-butanediol, butene-2-diol-1,4, 1,6-hexanediol, 2,5-hexanediol, thiodiglycol, 1,3- and 1,4-hexahydroxylylene glycol, 1,3- and 1,4-cyclohexanediol, 1,4-phenylene - bis - hydroxyethylether, 1,5-naphthalene-bis-hydroxyethylether, glycerine-mono-allyl-ether, N,N'-bis-hydroxyethyl urea, N,N'-bis-hydroxyethylaniline and the like; amino alcohols, such as ethanolamine or propanolamine and the like; diamines such as ethylene diamine, tetramethylene diamines, hydrazine, N,N'-dimethyl hydrazine, N,N'-diamino-piperazine, 1,6-hexamethylene-bis-hydrazine, N,N' - dimethyl - hexamethylene-diamine-1,6-piperazine, 1,4 - diamino - cyclohexane, 4,4'-diamino-diphenylmethane, 4,4' - diaminodiphenyl-dimethyl-methane, 1,3,5-triethyl-2,4-diaminobenzene, 3,3'-dichloro- or 3,3'-dimethyl- or 3,3'-dimethyl or 3,3'-dimethoxy-4,4'-diaminodiphenylmethane and the like; water, dicarboxylic acids, or hydrazides of dicarboxylic acids and disulphonic acids such as adipic acid dihydrazide, oxalic acid dihydrazide, isophthalic acid dihydrazide, thiodipropionic acid dihydrazide, tartaric acid dihydrazide, 1,3-phenylene-disulphonic acid dihydrazide and the like; carbodihydrazide as well as ω-aminocapronic acid dihydrazide, γ-hydroxybutyric acid hydrazide, bis-semi-carbazide, as well as bis-hydrazine carbonic esters of glycols such as butanediol or ethylene glycol and the like.

Apart from the N,N-dialkylhydrazine derivatives according to the invention, other UV stabilizers or antoxidants may also be used thus resulting in a further increase in the protective action against the effect of light or UV radiation. As examples, there may be mentioned compounds of the benzophenone- or diphenylmethane type, e.g., 2,2'-dihydroxy-4,4'-dimethoxybenzophenone or 2,2'-dihydroxy-4,4'-dimethyl-6,6'-di-tertiary butyl-diphenylethane. Compounds such as 2-benzyl-6-tertiary butyl-4-methyl - phenol, 2,6 - diisopropyl - 4 - methylphenol, 4,4'-butylidene - di - (3-methyl-6-tertiary butylphenol), 2,5-di-tertiaryamyl- hydroquinone, 2,6-di-tertiarybutyl-4-methylphenol or 1-acetyl-4-benzoyl-resorcinol are also suitable. Further compounds or combinations are given, for example, in German Auslegeschriften 1,126,603 and 1,106,490 and in copending U.S. patent application Ser. No. 347,662.

A marked resistance of the polyurethanes to light is obtained by the simultaneous presence of compounds containing the

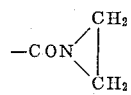

group (or

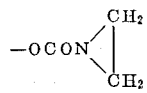

or

group) together with the dialkylhydrazide derivatives. In many cases, a synergistic increase in the effect appears to be present. After prolonged heating at temperatures, for example, of 80 to 140°, the synergistic effect of the ethylene imide compounds diminishes, presumably owing to ring opening of the aziridine which, in polyaziridine derivatives, leads to cross-linking of the polyurethane masses (see for example, copending U.S. patent applications Ser. No. 216,337, now United States Patent No. 3,232,908, and 257,749).

The polyurethane resins may contain, in addition to the above described light protecting agents or stabilizers, also cross-linking agents, e.g., polyisocyanates or their splitting products or epoxides, as well as pigments, e.g., titanium dioxide in the rutile or anatase modification, talcum, silicates or colored pigments or dyestuffs or compounds of divalent tin. The additional use of tin compounds such as tin-II-stearate in the presence of the stabilizers according to the invention has a good effect on the stability to light and the fastness of the polyurethane resins to waste gases.

In the following examples, the improvement of the light fastness is indicated mostly in elastic foils which are produced from solutions. The results are comparable to the effects obtained in threads although a slightly stronger effect on the strength and discoloration for a given exposure time to light may in many cases be observed in threads owing to their larger surface.

Owing to the intrinsic difference in the light fastness of the individual polyurethane resins, as already described above, the duration of the stabilization effect against discoloration under light may vary from case to case. However, a considerable improvement in the light fastness and the fastness to waste gases is invariably obtained by the addition of 1,1-dialkyl substituted semi-carbazides or carbazinic acid esters.

The samples are exposed to ultraviolet light from an Atlas Fade-O-Meter, Type FDA–R, at a test temperature of about 50 to 55° and a relative humidity of 45 to 50°, and the resulting discolorations of the synthetic resins are compared and the loss in mechanical strength is followed for example, by measurements of tear strength.

The test for fastness to waste gases is carried out by treatment with oxides of nitrogen or prolonged exposure to the combustion gases of a Bunsen burner.

The invention is further illustrated but not limited by the following examples in which parts are by weight unless otherwise specified.

Example 1

About 6000 parts of an adipic acid-hexanediol-1,6/2,2-dimethyl-propanediol-1,3-polyester (molar ratio of glycols 65/35; OH number 60.0; acid number 1.40) are dewatered for one hour at about 130° and about 12 mm. Hg and after cooling to about 70°, the substance is treated with about 1354 parts of diphenylmethane-4,4'-diisocyanate and about 1846 parts of anhydrous chlorobenzene, and the mixture is heated to an internal temperature of about 100° for about two hours. The NCO content after cooling is 1.84%.

About 8520 parts of the NCO preadduct thus prepared are introduced over about 30 minutes and with vigorous stirring into a 70° C. hot solution of about 182.5 parts of carbohydrazide in about 17,942 parts dimethylformamide and then treated with about 530 parts of a 33% pigment paste of TiO$_2$ (rutile) and dimethylformamide. After cooling to room temperature, the colorless solution has a viscosity of 286 poises at 20°. About 18.0 parts 1,6-hexane-diisocyanate in about 20 parts chlorobenzene are stirred into about 24,400 parts of the resulting solution which contains

—NHCONHNHCONHNH$_2$— end groups. Within about 30 minutes, the viscosity of the solution rises to 612 poises at 20° due to reaction with the end groups. The stabilizers dissolved in a little solvent (dimethylformamide or dioxane), are added in the given percentages by weight (calculated on the solids content) to portions of the solutions so obtained, and homogeneously distributed in the solution by prolonged stirring. These solutions are poured by suitable pouring devices onto glass plates and the solvent is evaporated off in a drying cupboard first at about 70°, then for about 45 minutes at about 100°.

A portion of the foils is then heated for 60 minutes at 130° in the drying cupboard and a portion of this is then boiled for one hour in boiling tap water to test for wash resistance of the light protective agent.

The resulting foils, about 0.1 to 0.2 mm. in thickness, are exposed to UV light in an Atlas Fade-O-Meter to test for discoloration.

Constitution and melting points of the stabilizers A–Z and of the comparison substances I and II are summarized in Table 1.

Table 2 shows the light stabilizing effect of these substances after incorporation in elastomer foils in dependence on the exposure time to light in the Fade-O-Meter.

TABLE 1

(A) $(CH_3)_2NNHCONH(CH_2)_6NHCONHN(CH_3)_2$ .................................................. M.P. 144–146° C.

(B) Biuret triisocyanate (according to D.A.S. 1,101,394):

$OCN(CH_2)_6NCONH(CH_2)_6NCO$
  |
  $CONH(CH_2)_6NCO$ + 3 mol 1,1-dimethylhydrazine .........................

(C) Biuret triisocyanate (as B) + 2 mols 1,1-dimethylhydrazine;
1 mol ethyleneimine.

(D) Biuret triisocyanate (as B) + 1 mol 1,1-dimethylhydrazine;
2 mols ethyleneimine.

(E) Biuret triisocyanate (as B) + 3 mols N-amino-morpholine .....................

(F) Biuret triisocyanate (as B) + 2 mols N-amino-morpholine;
1 mol ethyleneimine.

(G) 1,1,5,5-tetramethylcarbohydrazide:
$(CH_3)_2NNHCONHN(CH_3)_2$ .................................................. M.P. 151–153°.

(H) $(CH_3)_2NNHCONHNHCONH(CH_2)_6NHCONHNHCONHN(CH_3)_2$ ............... M.P. 225–227°.

(I) 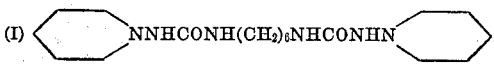 .................................................. M.P. 173–175°.

(J) 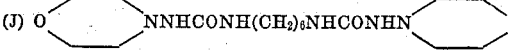 .................................................. M.P. 196–199°.

(K) ⟨⟩—NHCONHN(CH_3)_2 .................................................. M.P. 78–80°.

(L) $C_{18}H_{37}NHCONHN(CH_3)_2$ .................................................. M.P. 74–76°.

(M) 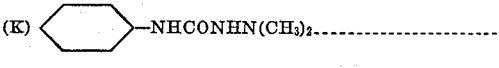
Isomeric mixture (N)  .................................................. M.P. 152–154°.

(O) 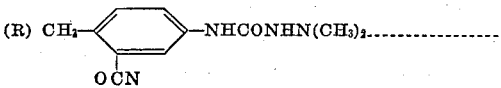 .................................................. M.P. 150°.

(P) 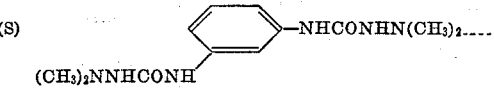 .................................................. M.P. 350° n.Z.

(Q) 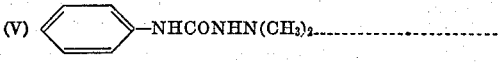 .................................................. M.P. 198–199°.

(R) 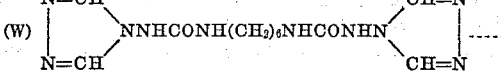

(S) ⟨⟩—NHCONHN(CH_3)_2 .................................................. M.P. 98°.
   |
   $(CH_3)_2NNHCONH$ (T) $(CH_3)_2NNHCONH$—⟨⟩—$NHCONHN(CH_3)_2$ .................................................. M.P. 250° u.Z.

(U) $CH_3CH_2C\left(CH_2OCONH-⟨⟩-CH_3 \atop NHCONHN(CH_3)_2\right)_3$ ..........................

(V) ⟨⟩—NHCONHN(CH_3)_2 .................................................. M.P. 106–108°.

(W) 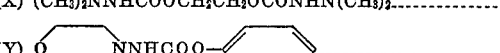 .................................................. M.P. 246–247°.

(X) $(CH_3)_2NNHCOOCH_2CH_2OCONHN(CH_3)_2$ .................................................. M.P. 133–135°.

(Y) O⟨⟩NNHCOO—⟨⟩ .................................................. M.P. 144–146°.

(Z) $(CH_3)_2NNHCOO$—⟨⟩ .................................................. M.P. 74–74.5°.

(I) $(CH_3)_2NCONH(CH_2)_6NHCON(CH_3)_2$ .................................................. M.P. 166–168°.

(II) Poly-(β-diethylaminoethyl-methacrylate) .....................................................

TABLE 2

| Stabilizer | Weight percent | After Treatment | Exposure to light 10 hours | 20 hours | 30 hours | 50 hours | Remarks |
|---|---|---|---|---|---|---|---|
| Without additive | | 100 / 130 / W / 130+W | Almost colorless | Yellowish | Yellow | Yellow brown | |
| (A) | 0.5 | | Colorless | Colorless | Colorless | Almost colorless | 100 hours, yellow brown. |
| | 1.0 | | do | do | do | Colorless | 100 hours, yellow. 150 hours, yellow brown. |
| | | 100 | | | | | |
| | 2.0 | | Colorless | Colorless | Colorless | Colorless | 100 hours, colorless. 150 hours, yellowish. |
| | | 130 | | | | | |
| | 3.0 | | Colorless | Colorless | Colorless | Colorless | 100, 150 hours, colorless. |
| | 2.0 | 130+W | do | Yellowish | Yellow | Yellow brown | Stabilizer water-soluble. |
| (B) | 3.0 | 130 / 130+W | Colorless / do | Colorless / do | Colorless / Almost colorless | Colorless / Yellow | Difficultly soluble in water. |
| (C) | 2.0 | 130 / 130+W | / | Colorless / Almost colorless | / | Yellowish / do | Stabilizer is predominantly chemically bound after heating to 130°. |
| | 4.0 | 130 / 130+W | Colorless / | Almost colorless / Colorless | / | Yellowish / Colorless | Foils difficultly soluble in DMF at room temperatures. |
| | 6.0 | 130 / 130+W | / | / do | / | Almost colorless / Almost colorless | Foil unexposed to light soluble in DMF at 25°. |
| (D) | 3.0 | 100 / 130 / 130+W | Colorless | Colorless | | Yellow / do | Foil unexposed to light insoluble in DMF; goes into solution when boiled. |
| (E) | 3 | 130 / 130+W | Colorless | Colorless | | Yellowish / Yellow | Stabilizer difficultly soluble in water. |
| (F) | 3 | 130 / 130+W | Colorless | Colorless | | Yellow | Stabilizer difficultly soluble, is bound chemically when heated. |
| (G) | 3 | 130 | Colorless | Colorless | Almost colorless | Yellowish | Stabilizer water-soluble sublimates. |
| (H) | 2.5 | 130 | do | do | Colorless | Colorless | Stabilizer very difficultly soluble in water. |
| (I) | 2.5 | 130 | do | do | do | do | |
| (J) | 2.0 | 130 | do | do | do | Almost colorless | |
| (K) | 2.5 | 130 | do | do | do | do | |
| (L) | 2.0 | 130 | do | do | do | do | |
| (M) | 2.5 | 130 | do | do | do | Colorless | |
| (N) | 3.0 | 130 | do | do | do | do | |
| (O) | 2.0 | 130 | do | do | Colorless | Yellow | |
| (P) | 3.0 | 130 | do | do | Almost colorless | Colorless | |
| (Q) | 2.5 | 130 | do | do | Almost colorless | Almost colorless | |
| (R) | 5 | 130 / 130+W | Colorless / do | Almost colorless / do | Almost colorless / do | Almost colorless / Yellowish | |
| (S) | 2 | 130 | Colorless | Colorless | Colorless | Almost colorless | |
| (T) | 2 | 130 | do | do | Colorless | Colorless | |
| (U) | 3 | 130 / 130+W | Colorless / do | Colorless / do | Colorless / do | Almost colorless / Yellowish | Almost colorless up to 100 hours. Very difficultly soluble in water. |
| (V) | 1.5 | 130 | Colorless | Almost colorless | Yellow | Yellow | |
| (W) | 2.8 | 130 | do | Colorless | Colorless | do | |
| (X) | 2 | 130 | do | do | do | Colorless | Colorless up to 100 hours. |
| (Y) | 2 | 130 | do | do | do | Yellowish | |
| (Z) | 2 | 130 / 130+W | Colorless / do | Colorless / do | Colorless / do | Colorless / do | Fast to washing. |
| (I) | 2 | 130 | Almost colorless | Yellowish | Yellow | Yellow-brown | |
| (II) | 5 | 130 | do | do | do | do | |

NOTE.—In the Column "After Treatment": 100=45 minutes at 100°; 130=45 minutes at 100° and one hour at 130°; W=45 minutes at 100° and boiled for one hour; 130+W=45 minutes at 100°, one hour at 130° and boiled for one hour.

EXAMPLE 2

About 600 parts of the NCO preadduct from Example 1 are poured with intensive stirring into a freshly prepared solution of about 7.04 parts of hydrazine hydrate in about 1083 parts of dimethylformamide and the resulting viscous solution is treated with about 33.5 parts of 33% titanium dioxide (rutile) dimethylformamide pigment paste. The colorless solution has a viscosity of 66 poises at 20° and is colored yellow after a few hours. On the addition of about 1.08 parts of 1,6-hexane diisocyanate, the viscosity rises within about 30 minutes to 510 poises/20°. The following stabilizers are added to portions of the solution, and the discoloration is tested by Fade-O-Meter illumination:

TABLE 3

| Stabilizer | Quantity | 10 hours | 20 hours | 50 hours |
|---|---|---|---|---|
| (A) | 2 | Colorless | Almost colorless | Almost colorless. |
| (B) | 3 | do | Colorless | Slightly yellowish. |
| (U) | 3 | do | Almost colorless | Do. |
| (II) | 5 | Almost colorless | Yellowish | Yellow-brown. |
| Without additive | 0 | Slightly yellowish | Yellow-brown | Do. |

EXAMPLE 3

About 1000 parts of the polyester from Example 1 are dewatered for about one hour at about 130°/12 mm. Hg and then treated with about 3 parts by volume of an approximately 30% solution of $SO_2$ in dioxane and again briefly evacuated. After cooling to about 60°, about 219.6 parts of diphenylmethane-4,4'-diisocyanate are added and the mixture is heated in a boiling water bath for about 50 minutes to an internal temperature of from about 97 to about 99°. The NCO content is 2.27%. About 1214 parts of the NCO preadduct melt are dissolved in about 520 parts of anhydrous chlorobenzene at about 50°. NCO content of the solution after cooling is 1.58%.

130° C. to fix them (a) in a drying cupboard with circulating air and (b) in a vacuum drying cupboard (1 mm. Hg).

The elastic and mechanical properties as well as the discoloration of threads with and without light protective agents are summarized in the following table. It is found that the fibers fixed by heating in vacuo have considerably better stability to degradation in light than the fibers heated in air. The cross-linking reaction of the diaziridine compound is not disturbed by the presence of the light protective agent. The fibers containing the stabilizer according to the invention have a considerably improved fastness to waste gases.

TABLE 4

| Stabilizer dried in air 1 Hr. at 130° | Unexposed to light | | | 20 Fade-O-Meter hours | | | 38 Fade-O-Meter hours | | |
|---|---|---|---|---|---|---|---|---|---|
| | Tear strength, g./den. | Elongation at break, percent | Appearance of fibers | Tear strength, g./den. | Elongation at break, percent | Appearance of fibers | Tear strength, g./den. | Elongation at break, percent | Appearance of Fibers |
| Without | 0.61 | 565 | Colorless | 0.09 | 200 | Yellow-brown | 0 | | Brown, crumbling. |
| 3% A of Ex. 1 and 2% hexane-1,6-di-(N,N-ethylene urea). | 0.57 | 640 | Colorless [1] | 0.46 | 561 | Colorless | 0.36 | 441 | Pale yellowish. |
| Heated in vacuo | 0.63 | 525 | Colorless [1] | 0.60 | 480 | do | 0.58 | 480 | Do. |
| 5% poly (β-dimethylaminoethylmethacrylate). | 0.69 | 550 | Colorless | 0.11 | 230 | Yellow-brown | 0 | | Brown, crumbling. |

[1] Fibers only dissolved in boiling dimethylformamide.

About 1600 parts of the preadduct solution are introduced with thorough stirring into a 75% hot solution of about 29.86 parts of carbohydrazide in about 2790 parts dimethylformamide within about 5 minutes and the resulting viscous solution (about 35 poises at 20°) is treated with about 86 parts of 33% $TiO_2$ pigment paste. The viscosity of the solution carrying the hydrazide group is 34.8 poises at 20°.

On the addition of about 5.068 parts of 1,6-hexane diisocyanate dissolved in about 15 parts by volume of chlorobenzene, the viscosity of the solution rises to 593 poises at 20°. The concentration is 26.8%.

About 1600 parts of solution are tested with about 12.72 parts stabilizer A from Example 1 dissolved in about 40 parts by volume of hot dimethylformamide and about 8.48 parts of hexane-1,6-di(N,N-ethyleneurea) (reaction product from hexane-1,6-diisocyanate and ethyleneimine, M.P. 106–107°), dissolved in about 35 parts by volume of hot dimethylformamide. The viscosity of the solution is 510 poises at 20°.

For comparison purposes, about another 1000 parts of solution are treated with about 13.4 parts of poly-(β-dimethylaminoethyl-methacrylate), dissolved in about 50 parts by volume of hot dimethylformamide.

Elastomer fibers are obtained from the solutions in a dry spinning process by spinning the solution at a rate of about 6.6 parts per minute through a nozzle with 16 bores of 0.20 mm. diameter into a shaft which is about 5 m. long and heated to 220° C. and the spun fibers are drawn from the shaft at a rate of 80 m. per minute and then wound at the rate of 160 m. per minute after treatment with an approximately 20% aqueous talcum emulsion.

The fibers are then heated for about 60 minutes to about

EXAMPLE 4

About 600 parts of a mixed polyester as used in Example 1 (OH number 66.5; acid number 1.0) are heated for about 75 minutes in a boiling water bath with about 104.5 parts freshly distilled phenylene - 1,4 - diisocyanate and about 175.5 parts chlorobenzene.

About 615 parts of the preadduct solution prepared as described about (2.78% NCO) and about 46.3 parts of a 33% $TiO_2$ (rutile) pigment paste are stirred into a 70° hot solution of about 19.4 parts carbohydrazide in about 1265 parts dimethylformamide, a solution having a viscosity of 161 poises at about 20° being thus obtained. By adding about 0.65 parts of hexane-1,6-diisocyanate, the viscosity of the solution rises to 430 poises at 20°.

3% by weight of stabilizer A or 3% by weight of stabilizer C are dissolved in portions of the solution. Foils of about 0.1 to 0.15 mm. thickness are formed from the solutions by the usual method and dried in the normal way (70/100°) or fixed by heat (1 hour/130°). A portion of the films is then boiled for one hour in boiling tap water. Samples of the films are then exposed to light in the Fade-O-Meter.

TABLE 5

| Additives | After treatment | 20 hours | 50 hours | 110 hours |
|---|---|---|---|---|
| Without stabilizer | 70/100°, dried; then boiled 1 hour. | Pale grey brown / do | Brownish / do | Brownish/brown. / Do. |
| Do | 70/100°+1 hour/130°; then boiled 1 hour. | do / do | do / do | Do. / Do. |
| +3% Stabilizer A | 70/100° dried; then boiled 1 hour. | Colorless / Pale grey brown | Colorless / Brownish | Colorless. / Brownish/brown. |
| Do | 70/100°+1 hour/130°; then boiled 1 hour. | Colorless / Pale grey brown | Colorless / Brownish | Colorless. / Brownish/brown. |
| +3% Stabilizer C | 70/100° dried; then boiled 1 hour. | Colorless / do | Colorless / do | Colorless. / Do. |
| Do | 70/100°+1 hour/130°; then boiled 1 hour. | Colorless [1] / do.[1] | Colorless [1] / do.[1] | Colorless.[1] / Do.[1] |

[1] Fibers have become insoluble in dimethylformamide at room temperature.

EXAMPLE 5

About 200 parts of a polytetrahydrofuran polyetherthioether (OH number 71; prepared by polymerization of tetrahydrofuran with chlorosulphonic acid, saponification of the $OSO_3H$ grouping with steam to the OH group and reacting the —$CH_2Cl$ end group with mercaptoethanol) are heated for about 1½ hours in a boiling water bath with 50.5 parts of diphenyl-methane-4,4'-diisocyanate in about 63.5 parts chlorobenzene.

About 103 parts of the above NCO preadduct solution (1.945% NCO) are introduced with vigorous stirring into a solution of about 2.24 parts carbohydrazide in about 309 parts dimethylformamide heated to about 70°, and the mixture is then treated with about 8 parts by volume of a solution of 0.168 parts hexane-1,6-diisocyanate in 20 parts by volume of chlorobenzene and about 6.3 parts of a 33% $TiO_2$ pigment paste. A solution having a viscosity of 282 poises at 20° is obtained.

4% stabilizer B are added to a portion of the solution.

methylformamide, and the solution is homogenized by stirring.

The solutions, with or without stabilizer A, are poured out to form foils. After drying (60 minutes/70°, 180 minutes/110° in vacuo), the foils of about 0.10 mm. thickness are illuminated in an Atlas Fade-O-Meter. The foils containing stabilizer A remain practically uncolored up to about 30 to 40 Fade-O-Meter hours whereas foils

TABLE 7

|  | 10 Hrs. | 20 Hrs. | 30 Hrs. | 50 Hrs. |
|---|---|---|---|---|
| Without additive | Yellowish | Yellow | Yellow brown | Brownish yellow. |
| 3% Stabilizer A | Uncolored | Uncolored | Uncolored | Yellow-yellow brown. |

Foils of about 0.1 mm. thickness are poured from the solution with and without stabilizer addition and illuminated in the Fade-O-Meter. Extremely strong discoloration and very strong deterioration of strength is found in the films containing no light protective additive whereas the values found in the films to which stabilizer has been added are much better.

without stabilizer A are distinctly discolored only after about 10 hours.

EXAMPLE 7

About 1.33 parts of 1,1-dimethyl-4-stearyl-semicarbazide together with about 10 parts by volume ethyl acetate are added to about 25 parts of 40% ethyl acetate solution of an adipic acid/1,3-butylene glycol/trimethyl-

TABLE 6

|  | Illumination in hours | | |
|---|---|---|---|
|  | 10 | 20 | 50 |
| Without additive | Yellowish brown | Deep brown | Deep brown. |
| Do | Affected mechanically | Serious loss of strength | Tends to break, without strength. |
| Stabilizer B | Colorless | Almost colorless | Yellowish. |
| Do | Practically unchanged | Practically unchanged | Affected mechanically. |

EXAMPLE 6

About 1000 parts of a mixed polyester of adipic acid/ethylene glycol/butanediol (molar ratio of glycols 1,1; OH number 55.0; acid number 0.70; water content 0.01%) are mixed with about 93.0 parts of butanediol-1,4, 14.4 parts titanium dioxide (rutile) and 0.31 g. iron-(III)-acetylacetonate at 60° and quickly treated, with stirring, with about 400 parts diphenylmethane-4,4'-diisocyanate. After a mixing time of about 3 minutes, the melt is poured into flat dishes and heated for another 15 minutes in an oven heated to about 110°, and the polyurethane mass, which is already solidified, is removed and then granulated when cooled.

The polyurethane so formed still contains a small quantity of free isocyanate groups and can be further condensed by further heating at about 100° C. The $\eta_i$-value of the polymerization substance at about 25° measuring temperature $$\eta_i = \ln \frac{\eta \, rel}{C}$$

(c.=1 g./100 cc.) dissolved in hexamethylphosphoramide at room temperature rises from $\eta_i$ 1.26 to $\eta_i$=1.42 after heating for 12 hours at 100° C.

To prepare a solution, about 660 parts of granulated polyurethane having a $\eta_i$ value of 1.26 are added portionwise to about 2340 parts of dimethylformamide at about 60 to about 70°, with stirring until solution is complete after about 8 hours. The viscosity of the solution is 925 poises at 20°. About 3.30 parts of 2,5-ditertiary amylhydroquinone are added to the solution and stirred until distribution is homogeneous.

About 150 parts of the solution are treated with about 1.0 parts stabilizer A dissolved in 6 parts by volume diolpropane mixed polyester (OH number 212) and gently heated until solution is complete. About 25 parts of a 45% ethyl acetate solution of the triisocyanate of 1 mol trimethylolpropane and 3 mols toluylene diisocyanate are stirred into this mixture.

After mixing for about 30 minutes, the lacquer mixture is painted with a brush on to a white photographic carton and dried in air.

In the same way, a lacquer mixture is prepared without the addition of light protective agent and is applied by painting.

When the samples are compared, the more rapid drying speed of the lacquer composition to which 1,1-dialkyl-4-stearyl-semicarbazide has been added is noticeable and the pot life of the lacquer composition is also reduced.

After 50, 100 and 150 hours illumination in the Fade-O-Meter, the lacquer coatings containing no additive have a clearly more pronounced discoloration than the coatings to which stabilizer has been added.

A similar improvement in the light resistance is also observed in lacquer films which contain 3% hexane-1,6-di-(N,N-dimethylsemicarbazide) in the lacquer composition.

EXAMPLE 8

A foam plastic made of a polyether (of trimethylolpropane and propylene oxide; OH number 42), toluylene diisocyanate (2,4/2,6-isomeric content 80/30) and water in the ratio 100:37:2.7 with the addition of 0.3 part of triethylenediamine and 0.3 part of tin-II-α-ethylhexoate and one part polysiloxane polyalkyleneglycol ester is cut into strips of about 4 mm. thickness and about 30 mm. in width. These strips are immersed in 3% aqueous or aqueous alcoholic solutions of stabilizer A, squeezed several times to remove liquid and then dried in air. The physical condition and discoloration are shown in the accompanying table.

Similar stabilisation effects are obtained in elastomers which are prepared from the above NCO preadduct with hydrazine instead of carbohydrazide and treated with the stabilizers.

TABLE 8

| Stabilizer | Illumination in the Fade-O-Meter in hours | | |
|---|---|---|---|
| | 10 | 20 | 50 |
| Without | Not markedly deteriorated, slightly stiffened. | Attacked on the surface, crumbles. | Completely disintegrated, crumbles to pieces. |
| With | Yellow brown. Not disintegrated. Almost colorless. | Yellow brown. Not disintegrated. Yellowish. | Yellow brown. Not disintegrated. Yellow. |

EXAMPLE 9

About 100 parts of an adipic acid-diethylene glycol/trimethylolpropane polyester (OH number 60) are thoroughly mixed with about 2.0 parts water, about 0.5 part silicone oil and about 1.0 part dimethylbenzylamine and treated with about 35 parts toluylene diisocyanate (2,4/2,6-isomer ratio=65/35) with stirring. A coarsely porous foam plastic having a weight per unit volume of about 45 kg./m.$^3$ is obtained.

To stabilize against light, about 1.3 parts of the very finely powdered stabilizer A are first dissolved in about 100 parts polyester at a temperature of about 70° and the remaining 1.4 parts stabilizer A are first dissolved in about 2 parts of water. The discoloration of the foam plastic when illuminated by the Fade-O-Meter is much less in the foam plastic to which the stabilizer has been added than in the unstabilized foam plastic.

TABLE 9

| | 10 Hours | 20 Hours | 50 Hours |
|---|---|---|---|
| Without additive | Pale brown | Brown | Deep brown. |
| With additive | Almost colorless | Yellowish | Yellow-yellow brown. |

EXAMPLE 10

500 g. of polytetrahydro furane (4.25 percent OH) are heated to an internal temperature of 80° C. with 54.4 g. of 2,4-toluylene diisocyanate and 95 g. of chloro benzene and then treated at an internal temperature of 98° C. for one hour with 133 g. of diphenyl methane-4,4'-diisocyanate in 200 g. of chloro benzene. After cooling to room temperature the NCO content of the preadduct is 1.445 percent.

791 g. of the above preadduct solution are introduced into 13.3 g. of carbohydrazide, dissolved in 1347 g. of 70° C. hot dimethyl formamide and 14.3 g. of titanium dioxide (rutile) are added with stirring. Upon the addition of 300 mg. of hexane-1,6-diisocyanate the viscosity of the solution rises from 298 to 511 poises at 20° C.

2.5 percent 1,6 - hexamethylene-bis-(N,N - dimethyl semicarbazide) (calculated on the solids content) are added to a portion of the solution and homogeneously distributed therein.

Foils of a thickness of about 0.1 mm. are prepared from the solutions without or with additive by means of suitable casting devices (drying at 100° C. for one hour). The foils are cut into threads, illuminated in the Fade-O-Meter and the properties are then determined (see Table 10).

EXAMPLE 11

6000 g. of the copolyester of Example 1, however with the hydroxyl number 66 and the acid number 1.53, are treated after dehydration (60 minutes at 130° C. and 15 mm. Hg) and cooling to 70° C. with 1493 g. of diphenyl methane-4,4'-diisocyanate and 1875 g. of chloro benzene and then reacted in the boiling water bath at an internal temperature of 95 to 98° C. The NCO content of the solution after cooling is 2.02 percent.

Portions of the aforesaid preadduct solutions are reacted with various chain-lengthening agents to yield solutions of high molecular weight polyurethanes.

(a) 1950 g. of the above NCO preadduct solution are run with rapid stirring into a solution of 60 g. of N,N'-diamino piperazine in 4280 g. of dimethyl formamide. After pigmenting with 40.5 g. of titanium dioxide (rutile) there is obtained a solution with 153 poises at 20° C. ($c=26.4$ percent). After dilution with dimethyl formamide to a concentration of 21 percent the solution is treated with 6.16 g. of 1,6-hexane diisocyanate whereupon the viscosity rises to 168 poises at 20° C.

(b) 1950 g. of the NCO preadduct solution are run with strong stirring into a solution of 25.15 g. of hydrazine hydrate in 4480 g. of dimethyl formamide. After the addition of 40.4 g. of titanium dioxide (rutile) there is obtained a solution of a viscosity of 200 poises at 20° C. After dilution with dimethyl formamide to a solids content of 22 percent 4.10 g. of hexane-1,6-diisocyanate are added whereupon the viscosity rises to 250 poises at 20° C.

(c) 1980 g. of the NCO preadduct solution (NCO content 1.97 percent) are run with intense stirring into a 70° C. hot solution of 45.3 g. of carbohydrazide in 4540 g. of dimethyl formamide. After treating with 40.3 g. of titanium dioxide (rutile) there is obtained a solution of the viscosity of 355 poises at 20° C. After dilution with dimethyl formamide to a solids content of 21 percent and the addition of 2.7 g. of hexane-1,6-diisocyanate the solution has a viscosity of 380 poises at 20° C.

(1) 2.5 percent hexamethylene-bis-N,N-dimethylsemicarbazide or (2) 2.5 percent piperazine-N,N'-dicarboxylic acid-bis-N,N-dimethylhydrazide (calculated on the solids

TABLE 10

| | Illumination in the Fade-O-Meter [1] | Tear strength, g./den. | Elongation at break, percent | Appearance |
|---|---|---|---|---|
| Without additive | 0 | 0.87 | 743 | Colorless. |
| | 10 | 0.66 | 684 | Yellowish. |
| | 40 | 0.07 | 280 | Yellow. |
| | 60 | 0.04 | 210 | Yellowish-brown. |
| With additive | 0 | 0.87 | 745 | Colorless. |
| | 10 | | | Do. |
| | 40 | 0.67 | 705 | Do. |
| | 60 | 0.58 | 691 | Do. |

[1] The threads were illuminated from both sides for an equally long period of time.

content) are homogeneously dissolved in the solutions (a), (b) and (c), foils are cast from the solutions (drying temperature 100° C.) and these are partially heated at 130° C. for another hour. The nondiluted films have the following appearance (a) yellowish shade which becomes more intensive upon heating;
(b) slightly yellowish shade which becomes somewhat more intensive upon heating;
(c) colorless films.

Threads of a thickness of 700 to 800 den. are cut from the films without stabilizer (0) or with stabilizer (1) or (2). As compared with the threads (b) and (c) the (2) threads show relatively low tensional forces.

Modulus 300 percent (mg./den.)
Thread (a) _____ 50
Thread (b) _____ 95
Thread (c) _____ 95

The threads are illuminated in a Fade-O-Meter from both sides for equally long periods of time for totally 0, 50, 100 and 200 hours. The values of tear strength and elongation at break as well as discoloration are shown in the following Table 11.

of the elastomer solution and the foils upon the addition of the light protective agent.

|  | Discoloration upon illumination in the Fade-O-Meter for— | | |
|---|---|---|---|
|  | 0 hours | 20 hours | 50 hours |
| Without additive | Yellowish-brown | Dark brown | Dark Brown. |
| With additive | Almost colorless | Almost colorless | Yellowish. |

EXAMPLE 13

1200 g. of the polyester of Example 1 are heated to 90 to 98° C. for 50 minutes with 334 g. of diphenyl methane-4,4'-diisocyanate and 384 g. of chloro benzene and subsequently cooled to room temperature (NCO content = 2.54 percent).

A solution of 20.55 g. of m-xylene diamine in 1165 g. of dimethyl formamide is converted by the addition of solid carbonic acid into a suspension of the m-xylylene diamine carbonates and introduced with intensive stirring into 500 g. of the above NCO preadduct solution. There is obtained a clear highly viscous solution of 900 poises at 20° C. which is pigmented by the addition of 24 g. of a 33 percent $TiO_2$ paste.

The solution is treated with 2 percent piperazine dicarboxylic acid-bis-(as-dimethyl hydrazide) and cast into elastomer foils. Upon illumination in the Fade-O-Meter there is observed a distinct improvement of the light fastness as compared with elastomer foils without additive.

TABLE 11

|  | 0 | | | 50 | | | 100 | | | 200 | | |
|---|---|---|---|---|---|---|---|---|---|---|---|---|
|  | A | B | C | A | B | C | A | B | C | A | B | C |
| Threads (a): (0) (1) (2) | 0.68 | 555 | Slightly yellowish | 0.29 / 0.39 / 0.54 | 537 / 540 / 598 | Yellowish / Unchanged / do | 0.09 / 0.30 / 0.51 | 378 / 590 / 575 | Yellow / Unchanged / do | (¹) / <0.10 / 0.17 | — / — / 455 | Yellowish-brown. / Yellow. / Yellowish. |
| Threads (b): (0) (1) (2) | 0.71 | 745 | Almost colorless | 0.12 / 0.36 / 0.61 | 321 / 540 / 660 | Yellowish-brown / Almost colorless / do | (¹) / <0.10 / 0.50 | — / — / 625 | Brownish-yellow / Yellow / Almost colorless | (¹) / — / 0.11 | — / — / 325 | Brown. / Brownish-yellow. / Yellow. |
| Threads (c): (0) (1) (2) | 0.84 | 760 | Colorless | 0.13 / 0.58 / 0.70 | 731 / 634 / 645 | Yellowish-brown / Colorless / do | 0.04 / 0.27 / 0.68 | 200 / 451 / 644 | Brownish-yellow / Almost colorless / Colorless | (¹) / <0.05 / 0.08 | — / — / 210 | Brown. / Brownish-yellow. / Yellow. |

¹ Mellow without stability.
A = Tear strength, g./den.  B = Elongation at break, percent.  C-Color.

EXAMPLE 12

600 g. of the polyester of Example 1 are heated to 90 to 98° C. for 50 minutes with 158 g. of diphenylmethane-4,4'-diisocyanate and 189 g. of chloro benzene and subsequently cooled to room temperature (NCO-content 2.34 percent).

500 g. of the NCO preadduct solution are added with stirring to a solution of 4,4'-diamino diphenylmethane in 930 g. of dimethyl formamide whereupon the viscosity rises up to 628 poises at 20° C. The solution is pigmented with $TiO_2$ (rutile) to a content of 2.5 percent $TiO_2$ (calculated on the solids content). Upon storing for several days the solution is discolored yellowish-brown.

2 percent piperazine dicarboxylic acid-bis-(as-dimethyl hydrazide) are added to a portion of the solution and the solution is cast into foils while the remainder of the solution is likewise cast into foils for comparison without additive. Upon illumination in the Fade-O-Meter there is shown a distinct improvement of the light fastness of the foils with additive as well as an appreciable brightening

|  | 20 hours | 50 hours |
|---|---|---|
| Without additive | Yellow | Yellowish-brown. |
| With additive | Colorless | Colorless. |

EXAMPLE 14

600 g. of the polyester of Example 1 are heated to an internal temperature of 95 to 98° C. with 193 g. of diphenyl methane-4,4'-diisocyanate and 199 g. of chloro benzene for 50 minutes. After cooling the NCO content is 3.57 percent.

400 g. of this NCO preadduct are mixed with 3.06 g. of water and 775 g. of dimethyl formamide; after the light-brown solution has reached a viscosity of 108 poises at 20° C. a further increase in viscosity is stopped by the addition of 0.5 g. of dimethyl hydrazine.

The following stabilizers are homogeneously distributed in portions of the solution in amounts shown in the table below and foils prepared from the solutions are illuminated.

| Stabilizer | Amount, Percent | Before Illumination | Before Illumination, 20 Hours | Before Illumination, 50 Hours |
|---|---|---|---|---|
| Without additive | | Yellowish brown | Brownish yellow | Brown. |
| With additive B of Table 1. | 2 | Colorless | Almost colorless | Yellowish. |
| Piperazine-dicarboxylic acid-bis-(N, N-dimethyl-hydrazine) (melting point 245–248°). | 2 | do | Colorless | Colorless. |

The fastness of the elastomers to waste gases is appreciably improved by the additives apart from the improvement of the intrinsic color of the foils and additives.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. Polyurethane polymers stabilized against discoloration and oxidation containing from about 0.5 to about 15 percent by weight of a member selected from the group consisting of 1,1-dialkyl semicarbazides and 1,1-dialkyl-carbazinic acid esters.

2. Polyurethane polymers stabilized against discoloration and oxidation containing from about 0.5 to about 15 percent by weight of 1,1-dialkyl semicarbazides.

3. Polyurethane polymers stabilized against discoloration and oxidation containing from about 0.5 to about 15 percent by weight of 1,1-dialkyl carbazinic acid esters.

4. Polyurethane polymers stabilized against discoloration and oxidation containing from about 0.5 to about 15 percent by weight of a member selected from the group consisting of 1,1-dialkyl semicarbazides and 1,1-dialkyl carbazinic acid esters, said group member containing the radical

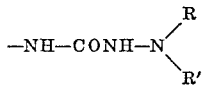

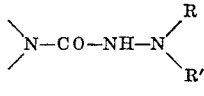

or

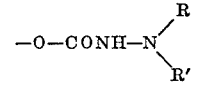

wherein R and R' are alkyl radicals and which when bonded together from a cyclic ring.

5. The polyurethane polymer of claim 4 wherein the 1,1-dialkyl semicarbazide contains the radical

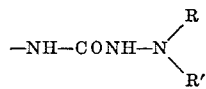

wherein R and R' are alkyl radicals which when bonded together form a cyclic ring.

6. The polyurethane polymer of claim 4 wherein the 1,1-dialkyl semicarbazide contains the radical

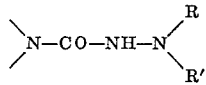

wherein R and R' are alkyl radicals which when bonded together form a cyclic ring.

7. The polyurethane polymer of claim 4 wherein the 1,1-dialkyl semicarbazide contains the radical

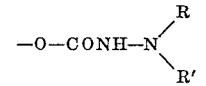

wherein R and R' are alkl radicals which when bonded together form a cyclic ring.

References Cited
UNITED STATES PATENTS

| | | | |
|---|---|---|---|
| 3,151,098 | 9/1964 | Watson et al. | 260—45.9 |
| 2,999,839 | 9/1961 | Arvidson, Jr. et al. | 260—45.9 |
| 3,074,911 | 1/1963 | Harper | 260—45.9 |
| 3,095,322 | 6/1963 | Sadowski et al. | 260—45.9 |
| 3,124,543 | 3/1964 | Fowler et al. | 260—2.5 |
| 3,149,998 | 9/1964 | Thurmaier | 260—45.9 |
| 3,351,608 | 11/1967 | Oertel et al. | 260—45.9 |

DONALD E. CZAJA, *Primary Examiner.*

R. A. WHITE, *Assistant Examiner.*